US006219790B1

United States Patent
Lloyd et al.

(10) Patent No.: US 6,219,790 B1
(45) Date of Patent: Apr. 17, 2001

(54) CENTRALIZED AUTHENTICATION, AUTHORIZATION AND ACCOUNTING SERVER WITH SUPPORT FOR MULTIPLE TRANSPORT PROTOCOLS AND MULTIPLE CLIENT TYPES

(75) Inventors: Brian Lloyd; Glenn McGregor, both of Cameron Park, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/100,092

(22) Filed: Jun. 19, 1998

(51) Int. Cl.$^7$ .................................................. C06F 11/00

(52) U.S. Cl. ............................................................ 713/201

(58) Field of Search ................................... 713/201, 200, 713/202; 380/4, 23, 25, 30; 709/223, 225; 340/825.31, 825.34

(56) References Cited

U.S. PATENT DOCUMENTS

| | | | |
|---|---|---|---|
| 5,272,754 | * 12/1993 | Boerbert | 380/25 |
| 5,497,421 | * 3/1996 | Kaufman et al. | 380/23 |
| 5,499,297 | * 3/1996 | Boebert | 380/23 |
| 5,502,766 | * 3/1996 | Boebert et al. | 380/25 |
| 5,586,260 | 12/1996 | Hu | 395/200.2 |
| 5,590,199 | * 12/1996 | Krajewski, Jr. et al. | 380/25 |
| 5,923,756 | * 7/1999 | Shambroom | 380/21 |
| 5,968,176 | * 10/1999 | Nessett et al. | 713/201 |
| 5,991,406 | * 11/1999 | Lipner et al. | 380/21 |
| 6,052,785 | * 4/2000 | Lin et al. | 713/201 |
| 6,061,799 | * 5/2000 | Eldridge et al. | 713/202 |

FOREIGN PATENT DOCUMENTS 0 949 788 A1  10/1999  (EP) .............................. H04L/29/06

OTHER PUBLICATIONS

CISCO: "Single–User Network Access Security TACACS+," CISCO Systems, Mar. 30, 1995, available at <http://www.cisco.com/warp/public/614/7.html>, 9 pages.
International Search Report for PCT Appl. No. PCT/US99/13651.

* cited by examiner

Primary Examiner—Nadeem Iqbal

(57) ABSTRACT

A system and method for authenticating and authorizing user access to a computer network. An AAA server comprises a plurality of Authentication transport protocol modules that interface with one or more clients using a native authentication transport protocol. The AAA server is coupled with a DBMS system that stores user authentication, authorization and accounting information in a standard format. Authentication and authorization are performed using a five phase process comprising the phases: Augmentation; Selection; Authentication; Authorization and Confirmation. During the Augmentation phase, client requests are translated into a standard internal format. The requests are parsed into a set of attribute/value pairs according to a parse rules table. In the Selection phase, the AAA server determines the details of the access request and identifies the permit required to authorize access. A rules table is used, wherein a particular row in the rules table is selected according to the attribute/value pairs from the Augmentation phase. The rules table provides the necessary details for the AAA server to formulate a proper response to the client. In the Authentication phase, the AAA server determines if the log in information provided by the user matches information stored in the user record. In the Authorization phase, the AAA server determines if the user is authorized to access the requested service by determining if the permit retrieved in the Selection phase matches the permit stored in the user database. In the Confirmation phase, the AAA server determines if a port limit has been exceeded and checks the client request for inconsistencies.

19 Claims, 6 Drawing Sheets

FIG. 4

| Key | Property |
|---|---|
| 401 — imp.radius.parse | |
| Value | |
| 402 — (.+)@(.+):(.+) | Parsed-User="$1", Parsed-Proxy="$2", Parsed-Selector="$3" |
| 404 — (.+)@(.+) | Parsed-User="$1", Parsed-Proxy="$2" |
| 406 — (.+):(.+) | Parsed-User="$1", Parsed-Selector="$2" |
| 408 — !(.+) | Parsed-User="$1", Parsed-Selector="admin" |
| 410 — (.+) | Parsed-User="$1" |

303

| Key | Value | | | Property | | | |
|---|---|---|---|---|---|---|---|
| imp.radius.rules | | | | | | | |
| | out | out | service | out | config | select | checks |
| 502 | #out | permit | ------ | ------ | ------ | ------ | ------ |
| 504 | #proxy | | | | | | |
| 506 | #----- | - | - | - | - | - | - |
| 508 | ic | - | - | - | - | - | - |
| 510 | info | async-ppp | fast-async | ppp | ppp | Called-Station-Id="676-6 |
| 512 | - | async-slip | fast-async | slip | slip | Called-Station-Id="555-1 |
| 514 | - | async-ppp | slow-async | ppp | ppp | NAS-Port-Type=Async,Conn |
| 516 | - | async-slip | slow-async | slip | slip | NAS-Port-Type=Async,Conn |
| 518 | - | isdn-ppp | isdn | ppp | ppp | NAS-Port-Type=Async |
| 520 | - | isdn-ppp | isdn | ppp | ppp | NAS-Port-Type=Async |
| 522 | - | isdn-ppp | isdn | ppp | ppp | NAS-Port-Type=ISDN |
| 524 | - | imp-operator | imp | imp | imp | NAS-Port-Type=ISDN-V120 |
| 526 | - | nas-operator | admin | admin | admin | NAS-Port-Type=ISDN-V110 |

*FIG. 5*

CENTRALIZED AUTHENTICATION, AUTHORIZATION AND ACCOUNTING SERVER WITH SUPPORT FOR MULTIPLE TRANSPORT PROTOCOLS AND MULTIPLE CLIENT TYPES

BACKGROUND OF THE INVENTION

1. Field of the Invention

The present invention relates generally to authentication, authorization and accounting systems, and more particularly to a centralized general purpose authentication, authorization and accounting server with support for multiple authentication transport protocols and multiple client types.

2. Related Art

Security is a major and continuing concern for managers and administrators of computer networks. For financial and security reasons, it is vitally important that only authorized users have access to the network. Additionally, access must be controlled so that users can only connect to systems and services in which they are entitled. For tracking and billing purposes, it is important to document the time users are logged onto the network and the services that are used. Finally, there is often a need to limit the number of times a user can simultaneously log onto the network.

Conventionally, each type of client provides a unique form of security for guarding against unauthorized break-ins and for controlling user access. For example, UNIX-type operating systems generally provide a user identification (UserID) and password scheme for authenticating pre-authorized users. Such systems also provide the ability to assign specific access rights for each user that is authorized to access the system Generally, data associated with pre-authorized users and their corresponding access rights are stored in a database on each client.

Other types of clients provide similar types of security measures using some form of a User ID and/or Password for authentication purposes. Sometimes encryption schemes are used to increase the level of security. Each client also provides an authorization mechanism to control user access to specific systems and services. Generally, each client maintains a separate database to store the user authentication and authorization information.

Generally, modem computer networks employ a variety of client types and have multiple points of access. For these networks it can be very difficult to manage, maintain and update user authentication and authorization information because such information is distributed among separate databases in a variety of clients. In addition, valuable storage resources are wasted because user data must be duplicated among the different client databases. This problem is multiplied when large networks with many points of access are implemented.

One solution to this problem is the use of distributed security servers. An example of a distributed security server is the Remote Authentication Dial-In User Service (RADIUS), provided by Livingston Enterprises, Inc. of Pleasonton California. Distributed security servers create a single centralized location for user authentication and authorization data. In this fashion, all user data is stored in a single location to facilitate the task of maintaining and updating user data. Further, by having all the data in one location, storage space is preserved because there is no need to duplicate user data on multiple machines.

Conventional distributed security servers are problematic in that they are designed to work with particular types of hardware and particular types of operating systems (i.e. client types). In addition, conventional security servers generally support a specific authentication transport protocol. Examples of authentication transport protocols in use today are: RADIUS transport protocol, provided by Livingston Enterprises, Inc.; Network Information Service (NIS), provided by SUN Microsystems Inc.; Kerberos, provided by the Massachusetts Institute of Technology; Microsoft Domain System (MDS), provided by Microsoft, Inc.; and AppleTalk by Apple Computer, Inc.

For many large computer networks, a variety of authentication transport protocols may be in use. For these networks, conventional security servers are inadequate to handle the different types of authentication transport protocols being used by clients on the network. Thus, multiple security servers must be used, or client software must be altered to support the authentication transport protocol being supported by the particular security server being used. The latter solution may not be possible for some client types. For example, it may not be possible to support Kerberos on a Macintosh computer system.

Additionally, conventional security systems typically only support specific types of operating systems. Examples of different operating systems include UNIX operating systems, Microsoft operating systems (Windows 95, Windows N/T and DOS) and Macintosh operating systems. For these networks, conventional security servers are inadequate to handle the variety of operating systems being used.

Still further, conventional security servers typically support authentication and authorization functions, but not accounting functions. Generally, user data used by conventional security servers is stored in a propriety format. For these systems, separate accounting databases and accounting systems are typically maintained. This is a waste of resources because much of the same data is used by both accounting and security systems. Therefore, it would be desirable to maintain a single database for both the accounting information and the user authentication and authorization information.

Accordingly, what is needed is a distributed security system capable of supporting a variety of authentication transport protocols used by a variety of client types and is capable of supporting accounting functionality from the same database used to store user authentication and authorization information.

SUMMARY OF THE INVENTION

Accordingly, the present invention is directed toward an Authentication, Authorization and Accounting server (AAA server), that is capable of supporting a variety of authentication transport protocols from a variety of client types. The AAA server of the present invention includes a standard database management system (DBMS) that stores user authentication and authorization data in a standard format. Accounting information and reports are stored and derived from the same DBMS used for authenticating and authorizing user access.

The AAA server of the present invention comprises a plurality of authentication transport protocol modules ("support modules"). Support for specific authentication transport protocols is contained within each support module. Each support module is coupled to one or more clients that request access to the network using a particular authentication transport protocol corresponding with the associated support module. In this fashion, support for the AAA server of the present invention is transparent to the clients requesting access to the network.

Each support module is coupled with an Accounting and Authorization module (AA module). The AA module is coupled with the DBMS and performs authentication and authorization functions on behalf of the clients using a novel five phase process. The five phase process comprises the following phases: Augmentation; Selection; Authentication; Authorization and Confirmation.

During the Augmentation phase, client requests are translated into a standard internal format used by the AA module. The requests are parsed into a set of attribute/value pairs according to a parse rules table. An attribute/value pair is referred to as a tuple. A complete set of tuples associated with a particular client request is referred to as a tuple vector.

In the Selection phase, the AA module determines the details of the access request. In addition, a specific permit is extracted from a rules table. The permit is used later during the Authorization phase to be sure the particular user making the request is authorized to access the requested service. A rules table is used, wherein a particular row in the rules table is selected according to the attribute/value pairs from the Augmentation phase. The rules table provides the necessary details for the AA module to formulate a proper response to the client.

In the Authentication phase, the AA module determines if the log-in information provided by the user matches information stored in the user record. Specifically, the DBMS is queried and the user record is retrieved. If the user record matches the information (such as UserID and password) provided by the user, the request is authenticated If not, a reject message is sent to the client and the user is denied access to the network.

In the Authorization phase, the AA module determines if the user is authorized to access the requested service by determining if the permit retrieved during the Selection phase matches the permit stored in the user database.

In the Confirmation phase, the AA module determines if a port limit has been exceeded to prevent a user from simultaneously logging onto the network more than a specified number of times. In addition, sanity checks, such as examining the client request for inconsistencies, are performed during the Confirmation phase.

Accounting data is stored in the DBMS system by the AAA server as required. Reports are generated by the AAA server of the present invention by accessing the DBMS for accounting information. This can be used for billing purposes and the like.

BRIEF DESCRIPTION OF THE FIGURES

The present invention is described with reference to the accompanying drawings, wherein:

FIG. 4 is an example of a parse rules table according to an embodiment of the present invention;

FIG. 5 is an example of a rules table according to an embodiment of the present invention.

DETAILED DESCRIPTION OF THE PREFERRED EMBODIMENTS

Figure 1:
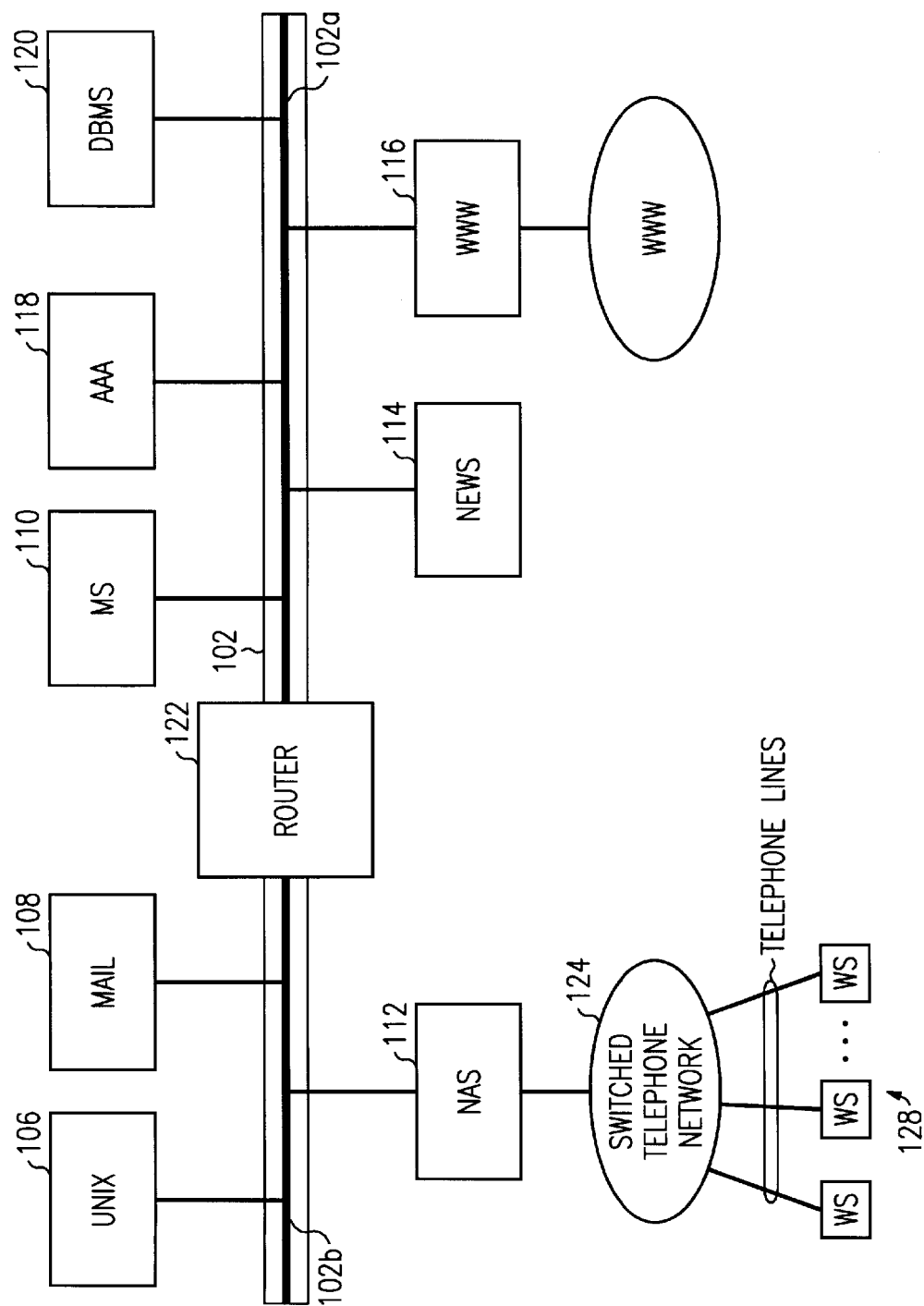
FIG. 1 is a block diagram depicting an example operational environment according to an embodiment of the present invention.

FIG. 1 is a block diagram depicting a typical operational environment according to one embodiment of the present invention. An embodiment of the present invention is typically used by corporate network managers, Internet Service Providers (ISPs) and the like. In FIG. 1, a computer network 102 is depicted. In this example, the computer network 102 comprises two local area networks (LANs) 102a and 102b. The two LANs 102a and 102b are coupled together via a router 122. The type of network 102 depicted in this example embodiment is referred to as a wide area network (WAN).

The computer network 102 is shown for illustrative purposes only. Other types of computer networks having different configurations can be used in alternate embodiments of the present invention. For example, a single LAN or multiple LANs connected together via one or more routers or similar device(s) can be used. In fact, any type of computer network can be used with the present invention.

Several types of network elements are depicted as being attached to the computer network 102. Some of these network elements represent services that are available to users having access to the network 102. Other elements perform the function of connecting users to the computer network 102. Some network elements perform both of these functions.

An embodiment of the present invention is represented by the combination of an Authentication, Authorization and Accounting server (AAA server) 118 and a data base management system (DBMS) 120. In this example, the DBMS 120 and the AAA server 118 are depicted as being embodied in separate devices or "boxes." This may not always be the case. In alternative embodiments the AAA server 118 and the DMBS server 120 can reside in a single device.

Likewise, the configuration and arrangement of other network elements shown in FIG. 1, are arbitrary and are depicted as separate boxes for convenience only. Alternate configurations may combine more than one element in a single box, including the boxes used to describe the AAA server 118 and/or the DBMS server 120. Any such alternate configurations are within the scope and spirit of the present invention.

Many types of database systems can be used for the DBMS server 120 according to a preferred embodiment of the present invention. Preferably, a structured query language (SQL) relational database management system is used. The DMBS server 120 is used to store and retrieve user account information, billing information, usage statistics and other user data. Examples of DMBS systems that can be used with the present invention include commonly available systems from Informix, Microsoft, Oracle and Sybase.

The AAA server 112 performs security and accounting services for several of the network elements depicted in FIG. 1. The network elements that request security and accounting services from the AAA server 118 are referred to herein as "clients," while the AAA server 118 (along with the associated DBMS server 120) are referred to herein as "servers."

The clients depicted in this example are: a UNIX device 106; a general mail device 108; a Microsoft (MS) device 110; a network access server device (NAS) 112; a general news device 114; and a World Wide Web (WWW) device 116. The MS device 110 can be any computer system running a Microsoft operating system, such as Windows 95 or Windows N/T.

The NAS device 112 is connected to a plurality of workstations 128 via telephone lines and a switched telephone network 124. The function of the NAS device 112 is to provide access for dial-in users at the workstations 128.

Typical computer networks, such as the computer network 102, comprise multiple points of access. In this example, users can access the computer network 102 from any of the clients 106–116 depicted in FIG. 1. For example, users can directly or remotely log onto the UNIX client 106, the MS client 110 and/or the WWW client 116.

Users can generally request access to services from any of the available access points. For example, users directly or remotely connected to the UNIX device 106 can access the news device 114, the WWW device 116 or the mail device 108. Likewise, users dialed into the network via the NAS device 112, can access the UNIX device 106, the mail device 108, the MS device 110 or any of the other services depicted in FIG. 1. The configuration of access points and services accessible therefrom, depends on each specific implementation of the computer network used with the present invention. Such configurations would be apparent to those skilled in the relevant art(s).

The AAA server 118 functions to secure access to the computer network 102 against unauthorized access. The following is an example that describes the present invention in terms of its general functionality as a distributed security server.

All user authentication and network service access information to be used by the AAA server 118 is stored in a standard format within the DBMS server 120. This information is typically entered by system administrators or the like. Communication servers, such as the UNIX device 106, the mail device 108, the NAS device 112, the news device 114, the MS device 110 and the WWW device 116, operate as clients to the AAA server 118. The clients 106–116 send authentication requests to the AAA server 118 and act according to answers received from the AAA server 118.

The AAA server 118 authenticates users through a series of communications between the clients 106–116 and the AAA server 118. Once a user is authenticated, the clients 106–116 provide users with access to the appropriate network services. The following is an example of a typical authentication process using the AAA server 118 according to a preferred embodiment of the present invention. In this example, a user requests access to the network 102, from a workstation 128 connected to the NAS device 112.

Using a modem (not shown) from a remote location at one of the workstations 128, a user dials into a modem (not shown) connected to the NAS device 112. Once this modem to modem connection is complete, the NAS 112 prompts the user for a name and password.

The NAS 112 creates a data packet to form an authentication request. This packet includes information identifying the particular NAS 112 sending the authentication request, the port being used for the modem connection, and the user name and password provided by the user.

For protection from eavesdropping, the NAS client 112 encrypts the password before it is sent to the AAA server 118. Any type of encryption process can be used. Typically, an encryption key, that is known to the clients and the AAA server 118 is used to decrypt the message. The encryption key is referred to herein as a shared secret between the AAA server 118 and the various clients 106–116.

The Authentication Request is sent over the WAN 102 from the NAS 112 to the AAA server 118. When the Authentication Request is received, the AAA server 118 validates the request and decrypts the data packet, using the shared secret, to access the user name and password information.

Communications between the AAA server 118 and the NAS client 112 is performed using a specific authentication transport protocol. In a preferred embodiment, the authentication transport protocol is an application specific TCP/IP protocol. Examples of authentication transport protocols include RADIUS, NIS, Kerberos, MDS, and AppleTalk. In this example, RADIUS is used as the authentication transport protocol between the NAS 112 and the AAA server 118.

In order to determine if the user name and password are correct, the AAA server 118 performs a database query on the DBMS 120. If the user name and password are correct, the AAA server 118 sends an "Authentication Acknowledgment" to the NAS 112. The Authentication Acknowledgment typically includes information about the user's network system and service requirements. This information is provided from the data retrieved from the DBMS 120.

For example, the AAA server 118 tells the NAS 112 that the user needs TCP/IP and/or NetWare using Point-to-Point Protocol (PPP) or a Serial Line Internet Protocol (SLIP) to connect to the network 102. The Acknowledgment can also contain filtering information to limit a user's access to specific resources on the network 102. Such access rights are provided from the information retrieved from the DBMS 120 query.

If at any point in this log-in process conditions are not met, the AAA server 118 sends an "Authentication Reject" to the NAS 112 and the user is denied access to the network 102.

To ensure that requests are not responded to by unauthorized hackers on the network 102, the AAA server 118 typically sends an authentication key, or signature, that identifies itself to the NAS 112 client. Once this information is received by the NAS client 112, it enables the necessary configuration to deliver the right network services to the user.

Figure 2:
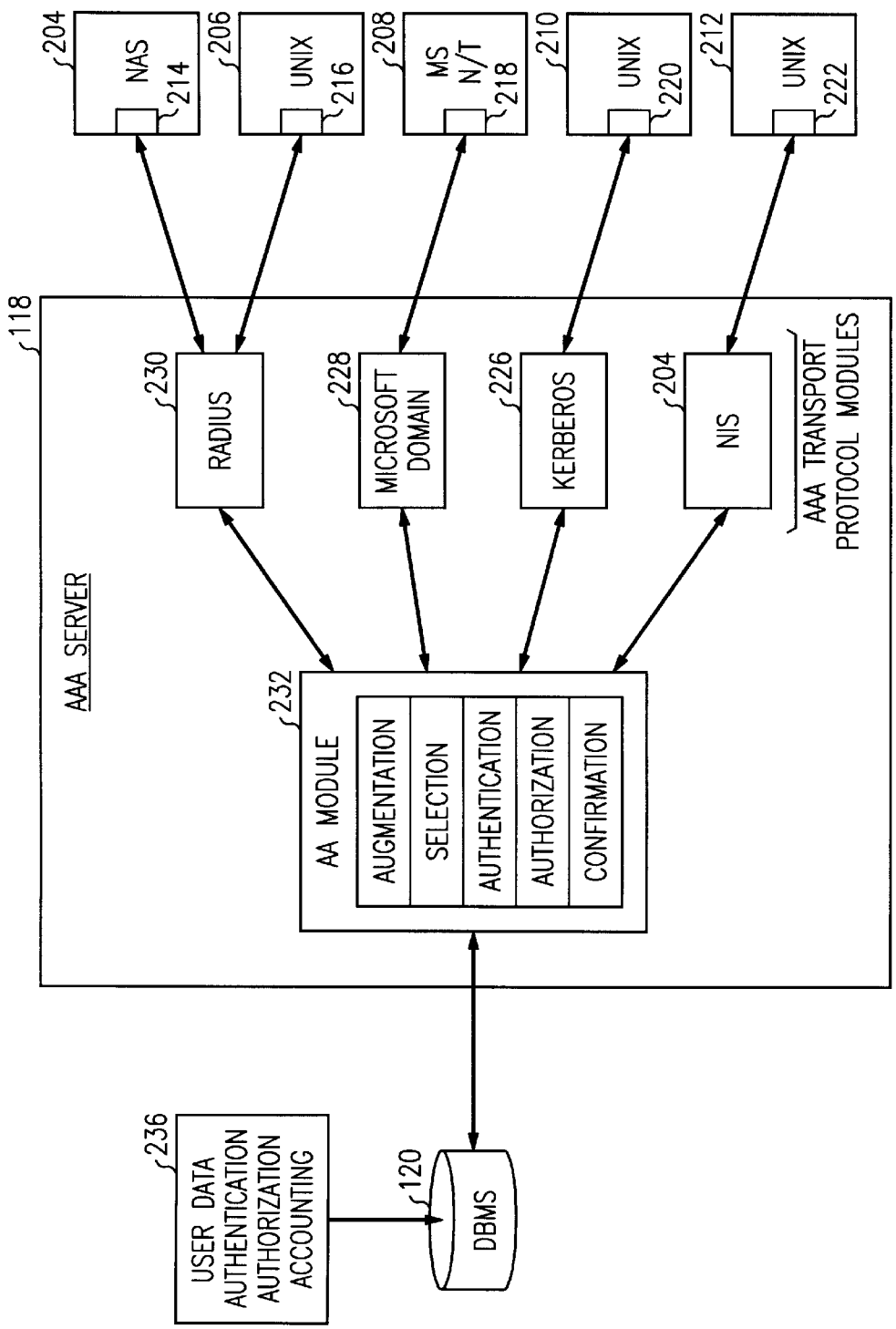
FIG. 2 is a block diagram showing the details of the AAA server according to an embodiment of the present invention.

FIG. 2 is a block diagram depicting details of the AAA server 118, according to a preferred embodiment of the present invention. In this example, the AAA server 118 provides AAA services for three UNIX clients 206, 210 and 210, one NAS client 204, and one Microsoft N/T client 208. User data 236 is available to the AAA server 118 from the DBMS server 120.

An important feature of the present invention is that it provides a means for supporting multiple authentication transport protocols. Further, the present invention provides an efficient means for adding support for additional protocols as required. This is accomplished, in part, by providing support for different protocols in separate modules referred to herein as authentication transport protocol support modules (or "support modules").

In this example, four specific authentication transport protocols are supported. Accordingly, the AAA server 118 comprises four support modules: a RADIUS module 230; a Microsoft Domain module 228; a Kerberos module 226; and an NIS module 204.

Programming support for each authentication transport protocol is completely contained within a corresponding authentication transport protocol support module. As will be described in detail below, the AAA server 118 (specifically, the AA module 232), uses an internal standard format for representing client requests and for constructing client responses. In this fashion, AAA processing is generalized and does not depend on any particular transport protocol. This facilitates support for multiple authentication transport protocols.

Accordingly, in the example, the RADIUS module 230 accepts RADIUS requests from the NAS 204 and UNIX 206 clients. RADIUS requests are translated to an internal format by the RADIUS module 230 for processing by the AA module 232. After processing by the AA module 232, a response or answer is sent to the RADIUS module 230, where it is converted to a RADIUS message and sent to the NAS 204 or UNIX client 206.

Similarly, the MS Domain module 228 accepts MS Domain requests from and sends MS Domain answers to the MS N/T client 208. The Kerberos module 226 accepts Kerberos requests from and sends Kerberos answers to the UNIX client 210. The NIS module 204 accepts NIS requests from and sends NIS answers to the UNIX client 212.

In this fashion, each of the clients 204–212 communicate with the AAA server 118 in their native protocol. This has the advantage of allowing conventional software to be used within each client 204–212 with little or no modification. In other words, support for the AAA server of the present invention is transparent to the clients 204–212 and are automatically supported. Thus, the software module 214 within the NAS client 204 needs little or no modification to be compatible with the AAA server 118 according to a preferred embodiment of the present invention. Likewise, the software modules 216, 218, 220 and 222 within the clients 206, 208, 210 and 212, respectively, need little or no modification to work with the AAA server 118.

The AA module 232 performs AAA functions in five phases as follows: (1) Augmentation; (2) Selection; (3) Authentication; (4) Authorization; and (5) Confirmation. This five phase process is described in detail below with reference to FIG. 3. User data, including User IDs, passwords, accounting information, and access rights, etc. are stored in the DBMS 120. This information is input by a system administrator or the like. Accounting information pertaining to user access times and services accessed is stored by the AAA server 118 in the DBMS 120.

Figure 3:
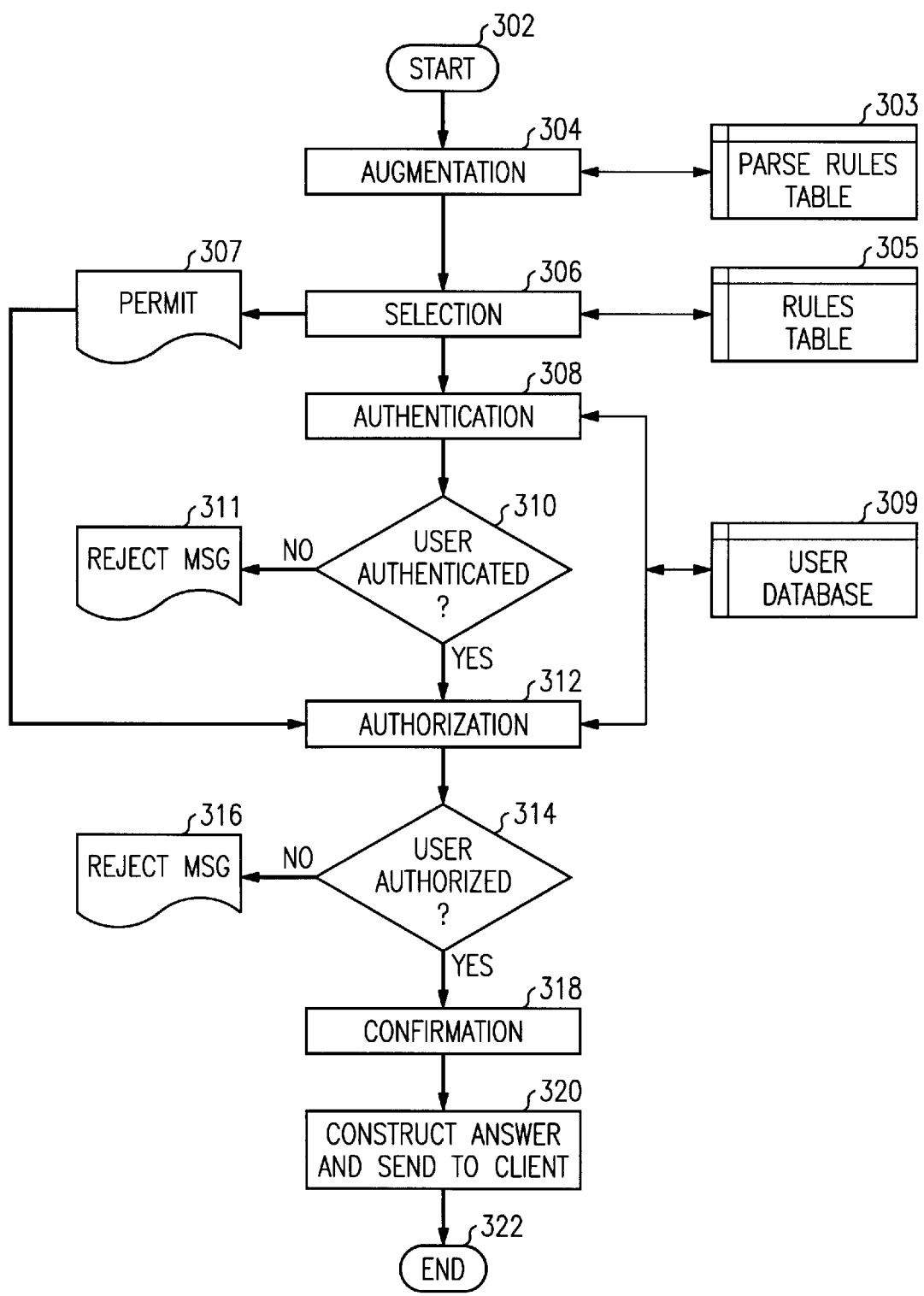
FIG. 3 is a flowchart depicting a five phase process that can be used by the AA module, according to an embodiment of the present invention.

FIG. 3 is a flowchart depicting a five phase process that can be used to implement the AA module 232, according to a preferred embodiment of the present invention. The process begins with step 302, where control immediately passes to step 304. In step 304, the Augmentation phase is performed.

In the Augmentation phase 304, client requests are parsed and organized into a standard internal format used by the AA module 232. Once a request has been augmented, there is no longer a difference between requests sent from different types of clients using different authentication protocols.

Generally, client requests are received by the AA module 232 as a single string of characters. The Augmentation phase 304 creates standard internal representations using a parse rules table 304 that is generally stored in the DBMS 120. The parse rules table 304 is typically defined by a system administrator or the like according to the needs of each implementation of the present invention. In a preferred embodiment of the present invention, user interface tools are provided to create and/or customize the parse rules table 304.

Preferably, client requests are represented as fixed attribute/value pairs referred to herein as tuples. An example of a tuple is: "CLIENT=UNIX". A set of tuples associated with a particular user is referred to as a tuple vector. An example of a tuple vector is the following set of tuples: "CLIENT=UNIX; USER=BOB; PASSWORD=XYZ; SERVICE=SLIP; SERVICE_REQ=ADMIN; CALLING_NO=555-2222; CALLED_NO=555-2323". In this example, the tuple vector consists of tuples that describe the client type, the user ID and password, the service selection, the service request, the calling telephone number and the called telephone number.

The parse rules table 304 is used to parse the client request into a tuple vector. The rules are based on expected requests from each client supported by each implementation of the present invention. The parse rule table 304 is customized according to such expected requests. In some implementations it may not be required to parse a client request because such requests are already in a parsed format suitable for the next phase of the process (described below), in which case the Augmentation phase 304 is skipped.

The amount of parsing required during the Augmentation phase 304, depends on the type and format of information sent by each particular client being supported by an embodiment of the present invention. It is important to understand that the use of the parse rules table 303 in the Augmentation phase 304 enables the present invention to be compatible with all types of clients and client software. This includes conventional or proprietary software running on the client. The parse rules table enables users of the present invention to transform any type of client request into a format that is compatible with subsequent AAA processing (described below) of the present invention.

FIG. 4 depicts an example of a parse rules table referred to as "imp.radius.parse" 401. This is an example of a parse rules table that can be used during the Augmentation phase 304 to analyze information supplied by the user at log-in.

The user log-in information is compared against the rules table 303 from the top line 402 to the bottom line 410. Preferably, the parse rules table 303 is structured so that the order of comparison is from the most specific rule to the least specific rule.

In this example, the parse.rules table 303 comprises five rules, each on a separate line 402–410. The symbols used in this example are defined as follows:

"(.)" indicates one character.

"(.+)" indicates one or more characters.

"$1", "$2", and "$3" symbols indicate which character set is being specified.

As shown in FIG. 4, the first rule 402 is as follows:

(.+)@(.+):(.+) Parsed-User="$1", Parsed-Proxy="$2", Parsed-Selector="$3"

A log-in request sent by a client matches the first rule 402 if it can be parsed into three sets of characters as follows:

one or more characters preceding an @ sign;

one or more characters after the @ sign and preceding a colon (":"); and one or more characters after the colon.

If there is a match, the first set of characters is taken as the username, the second set as the proxy server, and the third set as the service requested, or service selector. For example, if the user logs in as sequoyah@cherokee:ppp, the first rule 402 is matched. The rule determines that user sequoyah must be authenticated at the server called cherokee for authorization to use the ppp service. The following tuples are created as a result of this request: USER=sequoyah, DOMAIN=cherokee, SERVICE=ppp. Note that additional tuples that complete the tuple vector may also be created, such as tuples that identify the client making the request, the called telephone number, the calling telephone number, etc.

The second rule 404 depicted in FIG. 4 is as follows:

(.+)@(.+) Parsed-User="$1", Parsed-Proxy="$2"

A log-in sent by a client matches the second rule 404 if it can be parsed into two sets of characters as follows:

one or more characters preceding an @ sign one or more characters after the @ sign If there is a match, the first set of characters is taken as the username and the second set as the proxy server. For example, if the user logs in as buulinh@nhatrang, the second rule 404 is matched. The rule determines that user buulinh must be authenticated at the server called nhatrang. Because a service is not specified in the log-in, the default service selector is used to determine the service is requested. The following tuples are created as a result of this request: USER=buulinh, DOMAIN=nhatrang.

Note that additional tuples that complete the tuple vector may also be created, such as tuples that identify the client making the request, the called telephone number, the calling telephone number, etc.

The third rule 406 depicted in FIG. 4 is as follows:

(.+):(.+) Parsed-User="$1", Parsed-Selector="$2"

A log-in sent by a client matches the third rule 406 if it can be parsed into two sets of characters as follows:

one or more characters preceding a colon one or more characters after the colon

If there is a match, the first set of characters is taken as the username and the second set as the service requested, or service selector. For example, if the user logs in as dinh:ppp, the third rule 406 is matched. This rule determines that user dinh must be authenticated and is requesting authorization for ppp service. The following tuples are created as a result of this request: USER=dinh, SERVICE=ppp. Note that additional tuples that complete the tuple vector may also be created, such as tuples that identify the client making the request, the called telephone number, the calling telephone number, etc.

The forth rule 408 depicted in FIG. 4 is as follows:

!(.+) Parsed-User="$1", Parsed-Selector="admin"

A log-in sent by a client matches the fourth rule 408 if it can be parsed into a single set of characters as follows:

one or more characters following an exclamation point or bang sign (!)

If there is a match, the character set is taken as the username. For example, if the user logs in as !buulinh, the fourth rule 408 is matched. This rule determines that user buulinh is requesting authentication. In this example, because the bang sign ("!") is used, the service selector is set to admin. The following tuples are created as a result of this request: USER=buulinh, SERVICE_REQ=admin.

Note that additional tuples that complete the tuple vector may also be created, such as tuples that identify the client making the request, the called telephone number, the calling telephone number, etc.

The fifth rule 410 depicted in FIG. 4 is as follows:

(.+)Parsed-User="$1"

The log-in matches the fifth rule if it can be parsed into a single set of characters as follows:

one or more characters

If there is a match, the character set is taken as the username. For example, if the user logs in as sequoyah, the fifth rule 410 is matched. This rule determines that user sequoyah is requesting authentication. The following tuple is created as a result of this request: USER=sequoyah. Note that additional tuples that complete the tuple vector may also be created, such as tuples that identify the client making the request, the called telephone number, the calling telephone number, etc. Because no service is specified in the log-in, the default service selector will be used to determine what service is requested.

As stated, the parse rules table 303 is structured so that the order of comparison is from the most specific rule to the least specific rule. The reason for this should now be evident from the above example. For instance, in the above example, if the order of rules were reversed, (i.e. the fifth rule 410 appears at the top of the table 303), all of the above example log-in requests would have matched the first rule.

This is because all that is required by rule 410 is a log-in comprising one or more characters. All of the examples presented above have at least that characteristic in common. Thus, if rule 410 were to appear at the top of the list, a match would be found immediately upon processing the first row of the table 303, and no further processing would take place. Thus, it is important that the most specific rules are presented before the less specific rules in this example implementation of processing a parse rules table 303.

It should be noted that in a preferred embodiment, if the components in the client request do not match any of the rules in the parse rules table 303, a reject message is sent to the client and the user is prevented from accessing the network 102.

Referring back to FIG. 3, after the Augmentation phase 304 is complete, control passes to step 306. In step 306 the Selection phase is performed. In the Selection phase 306, the process determines the details of the access in which the user is requesting and identifies the permit 307 required to authorize such access. If a particular service was not parsed during the Augmentation phase 304, a default service is typically used for the Selection phase 306.

In a preferred embodiment, a selection of a particular service is accomplished by selecting a particular row in a rules table 305. Each row defines a particular service being offered. Data in the rules table is used to construct a response to the client The rules table 305 is typically defined by a system administrator or the like according to the services provided by each implementation of the present invention. In a preferred embodiment, user interface tools are provided to create and/or customize the rules table 305. An example of a rules table 305 that can be used with the present invention is shown in FIG. 5.

In this example, the AAA server 118 of the present invention uses a rules table 305, referred to as "imp.radius-.rules" 501 to filter incoming requests and to define services offered. The rules table 305 is used to implement specific access policies. The user authorization request is compared against the rules from the top line 506 to the bottom line 526 of the table. Preferably, the rules table 305 is structured so that the rule that matches the most common requests is compared first, then the next most common, and so on.

The imp.radius.rules table 305 is structured as a look-up table with an input section and an output section. The input section is used to match incoming requests (as parsed by the Augmentation phase 304) with a particular row in the rules table 305. The output section is used to formulate responses to clients comprising appropriate parameters so that client can correctly set-up the requested access. The input section comprises the two columns 536 and 538. The output section comprises four columns 528, 530, 532 and 534.

In the Selection phase 306, a single row from the rules table 305 is selected. The selection is based on matching tuples from the Augmentation phase 304, with one or more values in the input section 536 and 537 of a particular row.

For example, in one implementation, the Selection phase 306 examines the service request tuple and searches the rules table for the first instance of the particular service in the select input column 536. The select column 536 indicates the service selector that is being requested. Once a match is found, the process examines the remaining attributes in the checks column 538 to determine if they match the tuples in the tuple vector. If a match if found, that row is selected.

The checks column 538 contains the attribute-values that correspond with the request sent by the client. The AAA server 118 processes the service selector and its corresponding attribute-value pair to determine the precise service the user is requesting in order to formulate a response for the client. For example, line 510 corresponds to a PPP connection on an asynchronous port at 56 Kbps. In another example, line 518 corresponds to a PPP connection on an ISDN port.

The analysis of the input section determines a set of corresponding output values. The proxy column 528 enables a remote or proxy AAA server 118 to be called if specified. For example, if a user logs in as bob@ic:ppp, the user is requesting access to a proxy service "ic" as indicated in row 506. In this example, the user must call the specified telephone number in the checks column 538 specified in row 506 to be authorized for the proxy service.

The permit column 528 lists the permit (see 307 in FIG. 3) required to be held by the user to be authorized for the requested service. The permit 307 is extracted from the matched row in the rules table 305 and later checked against the permit stored in user database table 309 during the Authorization phase 310, as described below. The service output column 532 provides a label that is referenced by the AAA server 118 to bill the customer for services received.

For example, suppose a client request is received with the following log-in information: gracie:ppp and the user has dialed in on an ISDN line. The result of the Augmentation phase 304 is a tuple vector that contains at least the following tuples: USER=gracie, SERVICE=ppp, and NAS_PORT_TYPE=ISDN.

In this example, the checks column 538 is searched for an instance of "ISDN". The result of a top-to-bottom search of the rules table 305 is a match at row 518. Therefore, in this example, line 518 is selected and the output set from row 518, columns 530, 532 and 534 is used to formulate a response to client.

In this example, the permit 518 "isdn-ppp" (row 518) is retrieved and will be used in a later step to authorize the user. As described below, this will be used in the Authorization phase 310 to check that the user gracie is authorized to use this particular service.

If it is later determined that user is authorized, her session will be configured for PPP on ISDN. The user will be billed for the ISDN service. If this user logs in as gracie@ic:ppp, but does not call the telephone number specified in column 538, her authorization request is rejected.

Referring back to FIG. 3, once the Selection phase 306 is complete, control passes to the Authentication phase 308. In the Authentication phase 308, the AAA server 118 searches the user database 309 in the DBMS 120 for the combination of the username parsed from the log-in and the password presented at log-in. If the user requested a proxy server, the proxy is contacted for authentication. A user is authenticated if the username and password are found in the user database 309. The user is rejected if such information is not found.

Different security levels can be provided as well. This can depend on the type of security scheme being used by the particular client, such as a cryptographic authentication device, a public key cryptography system or the like. For example if SecureID authentication is specified in the user record in the database 309, then the AAA server 118 contacts the ACE/Server for authentication. In a preferred embodiment, the present invention provides a user interface so that system administrators or the like can specify the level of security required for particular services.

Depending on each specific implementation of the present invention, different access rights may be granted depending on the level of security being offered. For example, if only a User ID and password are used, access may be limited. One the other hand, if a cryptographic authentication device is used, the user may be allowed additional access such as read/write access to a database or access beyond a fire wall.

As step 310 indicates, if a user is not authenticated during the Authentication phase 308, a reject answer 311 is sent back to the client and the user is denied access to the network 102. If the user is authenticated, control passes to step 312 where the Authorization phase takes place. In the Authorization phase 312, the AAA server 118 checks the user record in the user database 309 for the presence of the required permit 307, as determined from the Selection phase 306. As step 314 indicates, if the user permit 307 is found, the user is authorized and control passes to step 318. If the user is not authorized, the client is sent a reject message 316 and the user is denied access to the network 102.

System administrators may allow access for a user even though the permit 307 does not match the service in which they are authorized. For example, a system administrator may allow a user authorized for high-speed ISDN service to access the network 102 using a low-speed asynchronous line. In a preferred embodiment, the present invention provides user interface tools that allow users to specify and customize access permits. In one example, this may be accomplished by providing a list of valid permits in each user record stored in the DBMS 120.

Once a user is authorized, control passes to the step 318, where the Confirmation phase is processed. In the Confirmation phase 318, one or more checks are made to assure the user can access the network 102 at this particular instant in time. For example, in some systems, it may not be desirable to allow a user to log-in to a network more than once at any particular time. This is especially true for users such as Internet Service Providers that allow users unlimited access to the Internet.

In one implementation, this is accomplished by including a port limit value in each users data record. Each time a user attempts access the AAA server 118 counts the number of connections currently open for that user. This can be accomplished by counting the accounting start and stop events and noting starts without corresponding stops. The Confirmation phase 318 then compares this number with the port limit specified in the users data record.

Additional checks can also be performed during the Confirmation phase 318. An example of an additional check is a sanity check to determine whether the requested service makes sense. For example if a user has signed on using PPP but asks for SLIP service, the AAA server 118 determines that the request does not make sense and sends a reject message to the client.

After the Confirmation phase is complete, control passes to step 320. In step 320, an answer is constructed and sent back to the client. The answer comprises all of the information necessary for the client to access the requested service. This information is taken from the selected row in the rules table 305. Answers can be standardized giving full access to the network 102, or may be customized for each user. Once the answer is constructed it is sent to a support module, such as the RADIUS support module 230, where the answer is converted into the specific authentication transport protocol and sent to the client making the request. The process ends as indicated by step 322.

It should be noted that according to a preferred embodiment, the AAA server 118 can run on a number of platforms. In a preferred embodiment, the AAA server code is written in a computer language that is transportable to many platforms, such as JAVA. In this fashion, the AAA server 118 can be run, unmodified on many computer platforms.

All of the user data 309 stored in the DBMS 120 is in a standard DBMS format. Accounting data is stored by the AAA server 118 using astandard DBMS format. Using a standard relational database system enables the AAA server 118 of the present invention to provide information and reports for many purposes including accounting. For example, information sent by clients about session establishment and termination is stored in the DBMS 120 in the user database 309. This allows the present invention to provide efficient billing and statistics gathering functions. The following types of reports can be generated according to a preferred embodiment of the present invention:

a summary report of activity for a particular log-in ID giving the amount of time a particular log-in ID has been in use in a given period of time, usually since the last billing period;

a detail report of activity for a particular log-in ID showing each session within a given period;

a summary report of activity for all log-in IDs associated with a particular customer;

a report showing modem/line utilization statistics.

Figure 6:
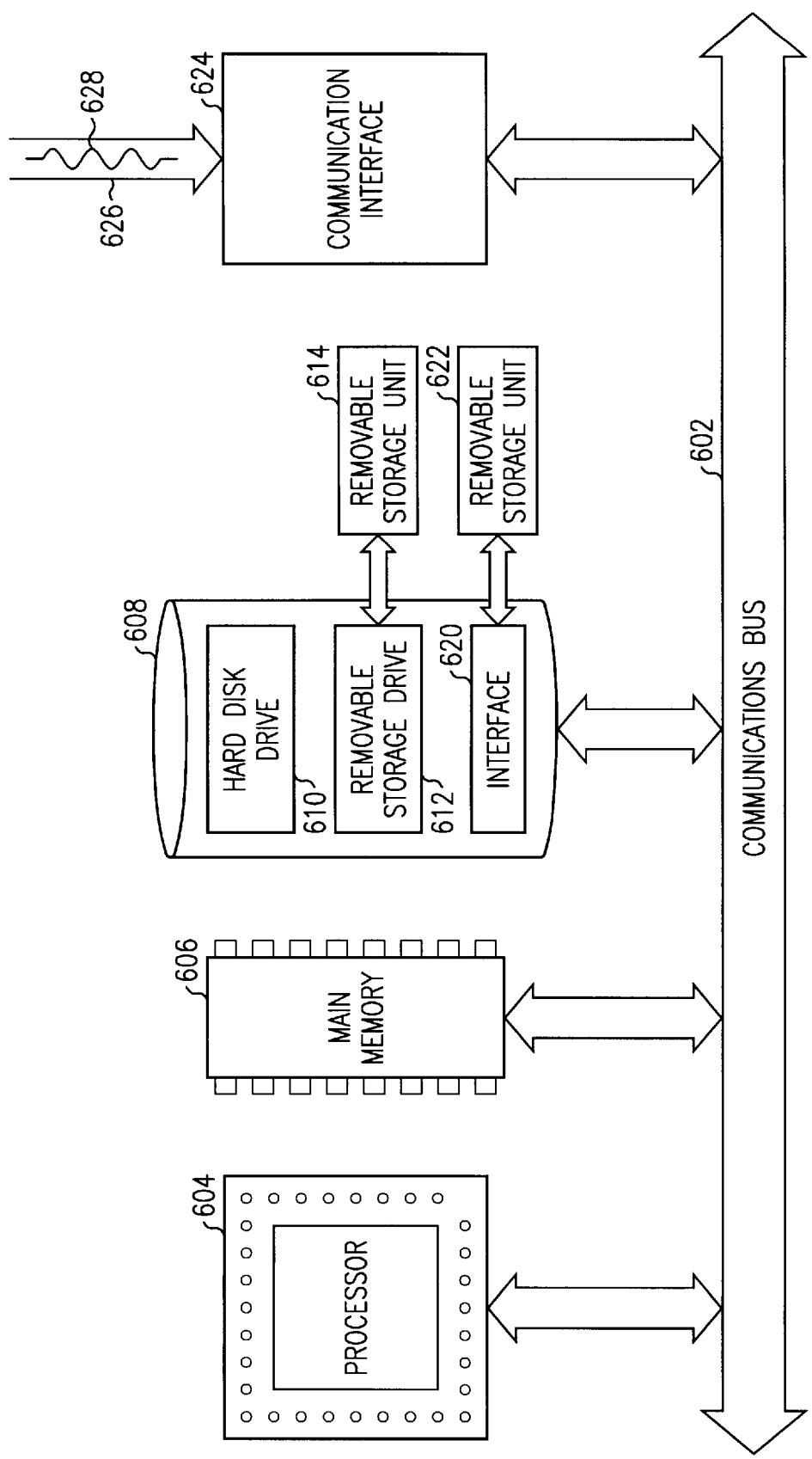
FIG. 6 is a block diagram of a computer useful for implementing components of the present invention.

The present invention may be implemented using hardware, software or a combination thereof and may be implemented in a computer system or other processing system. In fact, in one embodiment, the invention is directed toward a computer system capable of carrying out the functionality described herein. An example computer system 601 is shown in FIG. 6. The computer system 601 includes one or more processors, such as processor 604. The processor 604 is connected to a communication bus 602. Various software embodiments are described in terms of this example computer system. After reading this description, it will become apparent to a person skilled in the relevant art how to implement the invention using other computer systems and/or computer architectures.

Computer system 602 also includes a main memory 606, preferably random access memory (RAM), and can also include a secondary memory 608. The secondary memory 608 can include, for example, a hard disk drive 610 and/or a removable storage drive 612, representing a floppy disk drive, a magnetic tape drive, an optical disk drive, etc. The removable storage drive 612 reads from and/or writes to a removable storage unit 614 in a well known manner. Removable storage unit 614, represents a floppy disk, magnetic tape, optical disk, etc. which is read by and written to by removable storage drive 612. As will be appreciated, the removable storage unit 614 includes a computer usable storage medium having stored therein computer software and/or data.

In alternative embodiments, secondary memory 608 may include other similar means for allowing computer programs or other instructions to be loaded into computer system 601. Such means can include, for example, a removable storage unit 622 and an interface 620. Examples of such can include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 601.

Computer system 601 can also include a communications interface 624. Communications interface 624 allows software and data to be transferred between computer system 601 and external devices. Examples of communications interface 624 can include a modem, a network interface (such as an Ethernet card), a communications port, a PCM-CIA slot and card, etc. Software and data transferred via communications interface 624 are in the form of signals which can be electronic, electromagnetic, optical or other signals capable of being received by communications interface 624. These signals 626 are provided to communications inter face via a channel 628. This channel 828 carries signals 626 and can be implemented using wire or cable, fiber optics, a phone line, a cellular phone link, an RF link and other communications channels.

In this document, the terms "computer program medium" and "computer usable medium" are used to generally refer to media such as removable storage device 612, a hard disk installed in hard disk drive 610, and signals 626. These computer program products are means for providing software to computer system 601.

Computer programs (also called computer control logic) are stored in main memory and/or secondary memory 608. Computer programs can also be received via communications interface 624. Such computer programs, when executed, enable the computer system 601 to perform the features of the present invention as discussed herein. In particular, the computer programs, when executed, enable the processor 604 to perform the features of the present invention. Accordingly, such computer programs represent controllers of the computer system 601.

In an embodiment where the invention is implemented using software, the software may be stored in a computer program product and loaded into computer system 601 using removable storage drive 612, hard drive 610 or communications interface 624. The control logic (software), when executed by the processor 604, causes the processor 604 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A system for authenticating and authorizing user access to a computer network comprising:

a database management system; and a server comprising:

a plurality of authentication transport protocol support modules, each providing support for receiving user initiated requests from clients and sending answers to clients in a particular authentication transport protocol; and first means coupled to said plurality of transport protocol modules and said database management system for translating a request into a standard internal format, determining a service associated with said request, determining if information provided in said request matches information stored in a user record, determining if a user initiating said request is authorized to access said service associated with said request, and preventing said user initiating said request from logging onto the computer network more than a specified number of times.

2. The system of claim 1, wherein said first means comprises:

an augmentation module coupled with a parse rules table for parsing said request and creating a tuple vector according to said parse rules table;

a selection module coupled with a rules table for selecting a selected row in said rules table by matching one or more tuples in said tuple vector with values in said rules table and for retrieving a permit from said selected row;

an authentication module coupled with a user database for comparing one or more tuples in said tuple vector with a user record in said database, wherein said user record corresponds with said user initiating said request; and an authorization module for authorizing said request by comparing said permit with a permit stored in said user record.

3. The system of claim 2, wherein said first means further comprises:

a confirmation module for confirming said request by determining whether said user has exceeded a predetermined port limit according to the number of current active log on sessions associated with said user and a port limit value stored in said user record.

4. A process for authenticating and authorizing a request for access to a computer network from a client comprising the steps of:

receiving, at one of a plurality of transport protocol support modules, the request, wherein the request is formatted in accordance with a particular authentication transport protocol corresponding with said one of a plurality of transport protocol support modules;

translating, at said one of a plurality of transport protocol support modules, the request from said particular authentication transport protocol into a standard format;

augmenting the request, wherein said augmenting step includes parsing said standard format to create a tuple vector in accordance with a parse rules table;

selecting a row in a rules table by matching one or more tuples in said tuple vector with one or more values in said rules table;

retrieving a permit from said selected row in said selecting step;

authenticating the request by comparing one or more tuples in said tuple vector with a user record in a database management system, wherein said user record corresponds with a particular user specified in the request;

authorizing the request by comparing said permit from said retrieving step with a permit stored in said user record;

constructing an answer to the client in accordance with results from said augmentation, selection, authentication and authorization steps; and sending said answer to the client.

5. The process of claim 4, further comprising the steps of:

confirming the request by determining whether said particular user has exceeded a predetermined port limit according to the number of current active log on sessions associated with said particular user and a port limit value stored in said user record; and sending an authorization response to the client if said confirming step indicates that said port limit value has not been exceeded; and sending a reject message to the client if said confirming step indicates that said port limit value has been exceeded.

6. The process of claim 4, wherein said constructing step comprises the step of constructing a reject message if said authenticating step indicates a mismatch between said one or more tuples and said user record.

7. The process of claim 4, wherein said sending step comprises the step of sending a reject message to the client if said authorization step indicates a mismatch between said permit from said retrieving step and said permit stored in said user record.

8. The process of claim 4, wherein said sending step comprises the step of sending an appropriate authorization response to the client, if a match is found in said authenticating and said authorizing steps, said appropriate authorization response includes information from said selected row in said rules table.

9. The process of claim 4, further comprising the step of providing accounting data to the user record stored in the database, said accounting data including user access time and services accessed.

10. A computer program product comprising a computer useable medium having computer program logic stored therein, said computer program logic for authenticating and authorizing a request for access to a computer network from a client, wherein said computer program logic comprises:

means for enabling the computer to receive, at one of a plurality of transport protocol support modules, the request, wherein the request is formatted in accordance with a particular authentication transport protocol corresponding with said one of a plurality of transport protocol support modules;

means for enabling the computer to translate, at said one of a plurality of transport protocol support modules, the request from said particular authentication transport protocol into a standard format;

means for enabling the computer to augment the request, wherein said augmenting means includes means for enabling the computer to parse said standard format and create a tuple vector in accordance with a parse rules table;

means for enabling the computer to select a row in a rules table by matching one or more tuples in said tuple vector with one or more values in said rules table;

means for enabling the computer to retrieve a permit from said selected row;

means for enabling the computer to authenticate the request by comparing one or more tuples in said tuple vector with a user record in a database management system, wherein said user record corresponds with a particular user specified in the request;

means for enabling the computer to authorize the request by comparing said permit from said retrieving means with a permit stored in said user record;

means for enabling the computer to construct an answer to the client in accordance with results from said augmentation, selection, authentication and authorization means; and means for enabling the computer to send said answer to the client.

11. The computer program product of claim 10, wherein said computer program logic further comprises:

means for enabling the computer to confirm the request by determining whether said particular user has exceeded a predetermined port limit according to the number of current active log on sessions associated with said particular user and a port limit value stored in said user record; and means for enabling the computer to send an authorization response to the client, if said confirming means indicates that said port limit value has not been exceeded; and means for enabling the computer to send a reject message to the client if said confirming means indicates that said port limit value has been exceeded.

12. The computer program product of claim 10, wherein said constructing means comprises means for enabling the computer to construct a reject message if said authenticating means indicates a mismatch between said one or more tuples and said user record.

13. The computer program product of claim 10, wherein said sending means comprises means for enabling the computer to send are reject message to the client if said authorization means indicates a mismatch between said permit from said retrieving means and said permit stored in said user record.

14. The computer program product of claim 10, wherein said sending means comprises means for enabling the computer to send an appropriate authorization response to the client, if a match is found in said authenticating means and said authorizing means, said appropriate authorization response includes information from said selected row in said rules table.

15. The computer program product of claim 10, wherein said computer program logic further comprises:

means for enabling the computer to provide accounting data to the user record stored in the database, said accounting data including user access time and services accessed.

16. The system of claim 1, wherein said server provides information and reports.

17. The system of claim 16 wherein said reports include:

a summary report of activity for a particular log-in ID;

a detail report of activity for a particular log-in ID;

a summary report of activity for all log-in Ids associated with a particular customer; and a report showing modem/line utilization statistics.

18. The process of claim 9, further comprising the step of generating reports using said accounting data.

19. The computer program product of claim 15, wherein said computer program logic further comprises means for enabling the computer to provide reports using said accounting data.

\* \* \* \* \*